US011982226B2

(12) United States Patent
Torii

(10) Patent No.: US 11,982,226 B2
(45) Date of Patent: May 14, 2024

(54) EXHAUST STRUCTURE FOR INTERNAL COMBUSTION ENGINE

(71) Applicant: TOYOTA JIDOSHA KABUSHIKI KAISHA, Aichi-ken (JP)

(72) Inventor: Daisuke Torii, Nishio (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 12 days.

(21) Appl. No.: 18/333,549

(22) Filed: Jun. 13, 2023

(65) Prior Publication Data

US 2023/0407782 A1 Dec. 21, 2023

(30) Foreign Application Priority Data

Jun. 15, 2022 (JP) ................................ 2022-096653

(51) Int. Cl.
*F01N 13/00* (2010.01)
*F02B 77/08* (2006.01)

(52) U.S. Cl.
CPC .......... *F02B 77/086* (2013.01); *F01N 13/008* (2013.01)

(58) Field of Classification Search
CPC ............................. F01N 13/008; F02B 77/086
See application file for complete search history.

(56) References Cited

U.S. PATENT DOCUMENTS

2022/0011171 A1* 1/2022 Kopp ....................... G01K 7/02

FOREIGN PATENT DOCUMENTS

| | | | | |
|---|---|---|---|---|
| DE | 102019113614 A1 * | 11/2020 | | F01N 13/008 |
| FR | 3021618 A1 * | 12/2015 | | B60K 13/04 |
| JP | H08-136353 A | 5/1996 | | |
| JP | H09-54168 A | 2/1997 | | |
| JP | 2003-222549 A | 8/2003 | | |
| JP | 2019-214944 A | 12/2019 | | |

OTHER PUBLICATIONS

Machine translation of DE-102019113614-A1, accessed Sep. 22, 2023. (Year: 2023).*
Machine translation of FR-3021618-A1, accessed Sep. 22, 2023. (Year: 2023).*

* cited by examiner

*Primary Examiner* — Jonathan R Matthias
(74) *Attorney, Agent, or Firm* — HAUPTMAN HAM, LLP

(57) ABSTRACT

An exhaust pipe is fixed to an internal combustion engine. A proximal end of a sensor guide is fixed to the exhaust pipe. A lead extends from an exhaust gas temperature sensor through the inside of the sensor guide to the outside of the sensor guide. The lead is fixed to a body of a vehicle outside the sensor guide. A distal end of the sensor guide is located forward of the proximal end.

10 Claims, 3 Drawing Sheets

EXHAUST STRUCTURE FOR INTERNAL COMBUSTION ENGINE

RELATED APPLICATIONS

The present application claims priority of Japanese Application Number 2022-096653 filed on Jun. 15, 2022, the disclosure of which is hereby incorporated by reference herein in its entirety.

BACKGROUND

1. Field

The present disclosure relates to an exhaust structure for an internal combustion engine.

2. Description of Related Art

Japanese Laid-Open Patent Publication No. 2019-214944 discloses an exhaust structure for an internal combustion engine. The exhaust structure includes an exhaust pipe fixed to the internal combustion engine, a catalyst for purifying exhaust gas, and an air-fuel ratio sensor. The exhaust pipe defines an exhaust passage through which exhaust gas flows. The catalyst is located in the exhaust pipe. The air-fuel ratio sensor is located on the upstream side of the catalyst in the exhaust pipe. The air-fuel ratio sensor is fixed to the exhaust pipe.

In the above-described exhaust structure, a lead is connected to the sensor. The lead is fixed to the body of the vehicle outside the exhaust pipe via a bracket or the like. The exhaust pipe may be heated to a high temperature. The exhaust pipe is thermally expanded at high temperatures. When the exhaust pipe is thermally expanded, the positional relationship between the sensor and the bracket or the like changes. If thermal expansion of the exhaust pipe increases the distance between the sensor and the bracket or the like, the lead may receive a strong tension.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an exhaust structure for an internal combustion engine includes an exhaust pipe fixed to the internal combustion engine, a tubular sensor guide including a proximal end fixed to the exhaust pipe, a sensor fixed to the exhaust pipe, and a lead extending from the sensor through an inside of the sensor guide to an outside of the sensor guide. The lead is fixed to a body of a vehicle at the outside of the sensor guide. A direction along a central axis of the exhaust pipe and toward an upstream side of exhaust gas is defined as a first direction. A distal end of the sensor guide is located in the first direction as viewed from the proximal end.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

<Overall Configuration of Exhaust Structure for Internal Combustion Engine>

One embodiment of the present disclosure will now be described with reference to FIGS. 1 to 3. In the following description, an exhaust structure 10 is mounted on a vehicle. When referring to directions, the up, down, front, back, left, and right of a driver seated in a driver's seat of a vehicle are used as references.

Figure 1:
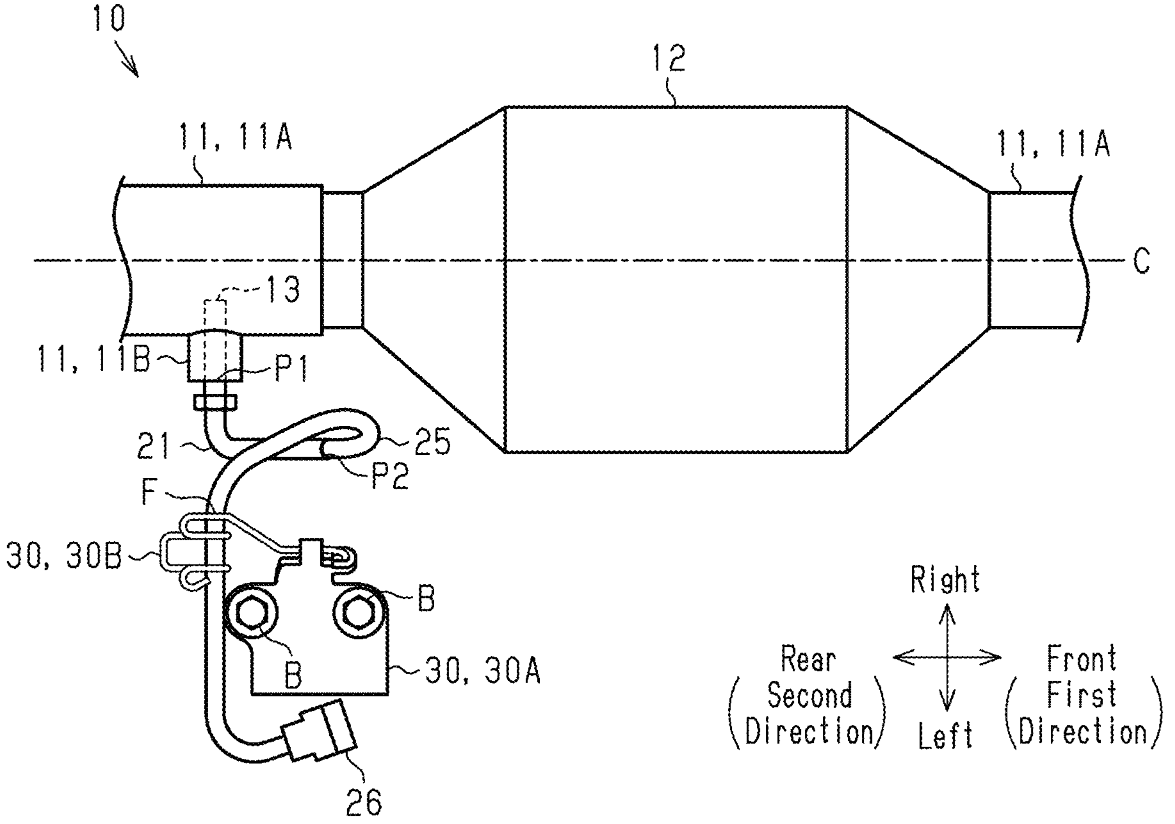
FIG. 1 is a bottom view of an exhaust structure for an internal combustion engine.
Figure 2:
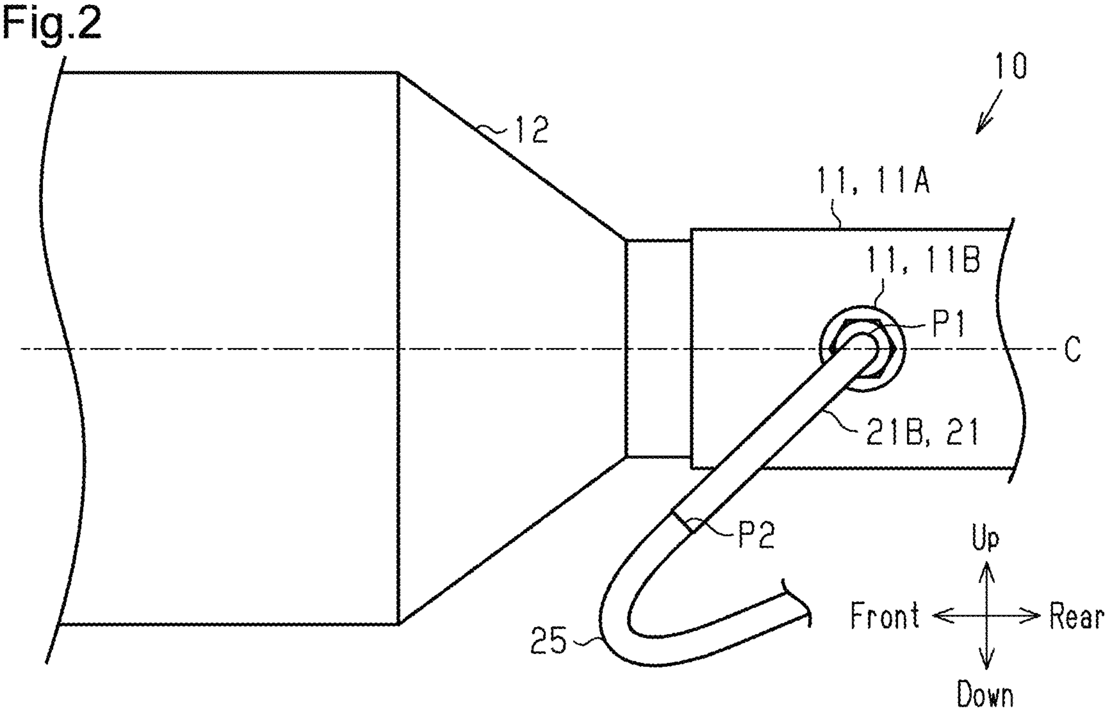
FIG. 2 is a side view of the exhaust structure for the internal combustion engine.

As shown in FIG. 1, the exhaust structure 10 includes an exhaust pipe 11, a gasoline particulate filter (GPF) 12, and an exhaust gas temperature sensor 13. The exhaust pipe 11 includes a pipe body 11A and an attachment portion 11B. The pipe body 11A is substantially cylindrical. The pipe body 11A defines an exhaust passage through which exhaust gas flows. An upstream end of the pipe body 11A is fixed to an internal combustion engine E (not shown in FIGS. 1 to 3). The pipe body 11A extends rearward from the internal combustion engine E. Exhaust gas from the internal combustion engine E thus flows rearward inside the pipe body 11A. A central axis C of the exhaust pipe 11 extends along a longitudinal axis of the vehicle. The front side corresponds to a first direction, and the rear side corresponds to a second direction.

The attachment portion 11B is substantially cylindrical. One end of the attachment portion 11B is connected to an outer surface on a left side of the pipe body 11A. The attachment portion 11B protrudes leftward from the outer surface of the pipe body 11A. The inside of the attachment portion 11B is connected to the inside of the pipe body 11A.

The GPF 12 is located in the pipe body 11A. Specifically, the GPF 12 is located forward of the attachment portion 11B in the pipe body 11A. The GPF 12 has a structure in which a ceramic filter is accommodated inside a cylindrical outer shell. The GPF 12 defines an exhaust passage together with the pipe body 11A. The GPF 12 traps particulate matter contained in the exhaust gas.

Figure 3:
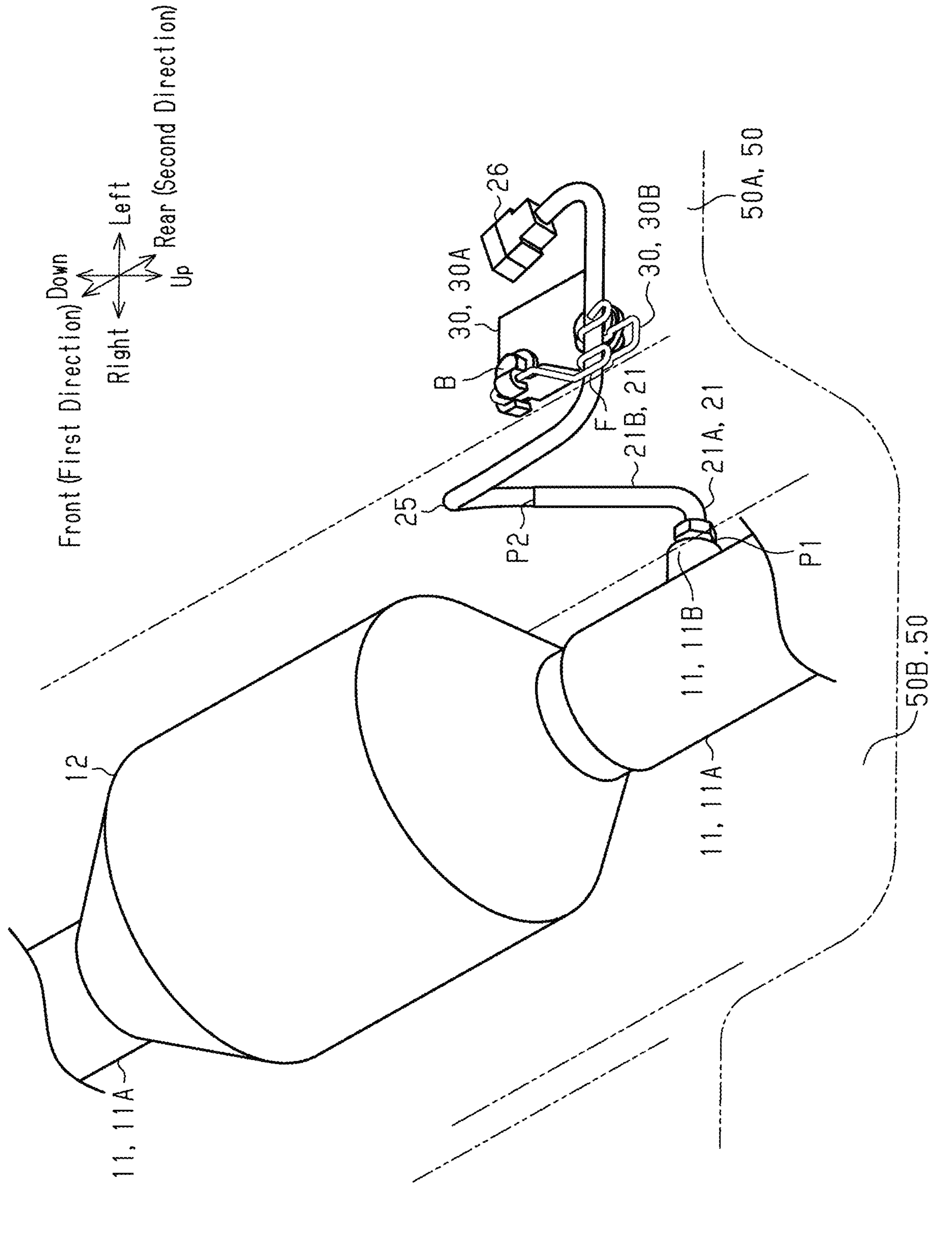
FIG. 3 is a perspective view of the exhaust structure for the internal combustion engine.

As shown in FIG. 3, the exhaust pipe 11 and the GPF 12 are located below (above, as viewed in FIG. 3) an under panel 50 of the vehicle. The under panel 50 is a panel that forms the floor surface of the vehicle. That is, the under panel 50 is part of the body of the vehicle. The under panel 50 includes a flat portion 50A and a center tunnel 50B. The center tunnel 50B is recessed upward (downward, as viewed in FIG. 3) with respect to the flat portion 50A. The center tunnel 50B extends along the longitudinal axis of the vehicle. The exhaust pipe 11 and the GPF 12 are located inside the recess of the center tunnel 50B.

As shown in FIG. 1, the exhaust gas temperature sensor 13 is located inside the attachment portion 11B of the exhaust pipe 11. The exhaust gas temperature sensor 13 is fixed to the attachment portion 11B. In FIG. 1, the exhaust gas temperature sensor 13 is indicated by an imaginary line. The exhaust gas temperature sensor 13 is substantially rod-shaped. Part of the exhaust gas temperature sensor 13 is located in the pipe body 11A. The exhaust gas temperature sensor 13 detects the temperature of exhaust gas flowing through the pipe body 11A. The attachment portion 11B is located rearward of the GPF 12. The exhaust gas temperature sensor 13 thus detects the temperature of exhaust gas on the downstream side of the GPF 12.

The exhaust structure 10 includes a sensor guide 21, a lead 25, a connector 26, and a mounting member 30. The sensor guide 21 has the shape of a circular tube. A proximal end P1 of the sensor guide 21 is fixed to the attachment portion 11B. The inside of the sensor guide 21 is connected to the inside of the attachment portion 11B. The sensor guide 21 is configured to guide the lead 25 in a specific direction so that the lead 25 does not interfere with other members. The structure of the sensor guide 21 will be described below.

The lead 25 is a multiconductor cable in which a power line for supplying power to the exhaust gas temperature sensor 13, a signal line for transmitting signals from the exhaust gas temperature sensor 13, and the like are bundled together. A first end of the lead 25 is connected to the exhaust gas temperature sensor 13. A portion of the lead 25 that includes the first end passes through the inside of the sensor guide 21. A portion of the lead 25 that includes a second end, which is opposite to the first end, is located outside the sensor guide 21. That is, the lead 25 extends from the exhaust gas temperature sensor 13 through the inside of the sensor guide 21 to the outside of the sensor guide 21.

The connector 26 is connected to the second end of the lead 25. The connector 26 is configured to electrically connect the lead 25 to other wires or the like. The connector 26 electrically connects the lead 25 to an electrical control device of the vehicle.

As shown in FIG. 3, the mounting member 30 includes a bracket 30A and a wire 30B. The bracket 30A is substantially plate-shape. The bracket 30A is fixed to the flat portion 50A of the under panel 50 by two bolts B.

The wire 30B is made of metal. A first end of the wire 30B is fixed to the bracket 30A. The wire 30B is bent multiple times. The wire 30B is formed to hold and support the lead 25. The wire 30B is thus fixed to the under panel 50, which is part of the vehicle body, with the mounting member 30. When the lead 25 is traced from the first end toward the second end of the lead 25, the point at which the lead 25 first comes into contact with the wire 30B is a fixing point F fixed to the under panel 50. As shown in FIG. 1, the fixing point F is located at the same position as the proximal end P1 of the sensor guide 21 in the direction along the central axis C of the exhaust pipe 11.

<Sensor Guide and Surrounding Structure>

As shown in FIG. 1, the sensor guide 21 is bent at substantially 90 degrees in the middle. Specifically, as shown in FIG. 3, the sensor guide 21 includes a first portion 21A, which includes the proximal end P1, and a second portion 21B, which includes a distal end P2 on the opposite side to the proximal end P1. The first portion 21A linearly extends leftward from the attachment portion 11B of the exhaust pipe 11. The first portion 21A occupies about one third of the total length of the sensor guide 21.

The second portion 21B is connected to the left end of the first portion 21A. As shown in FIG. 2, the second portion 21B extends obliquely forward and downward from the left end of the first portion 21A. That is, the second portion 21B is positioned to descend toward the distal end P2. When the sensor guide 21 is viewed from the left, an acute angle formed by the central axis of the second portion 21B and the central axis C of the exhaust pipe 11 is less than or equal to 45 degrees. The second portion 21B occupies the remaining approximately two-thirds of the total length of the sensor guide 21. That is, the second portion 21B is longer than the first portion 21A.

As shown in FIG. 3, since the sensor guide 21 has a bent shape, the distal end P2 of the sensor guide 21 is located forward of the proximal end P1. As described above, the fixing point F of the lead 25 is located at the same position as the proximal end P1 of the sensor guide 21 in the direction along the central axis C of the exhaust pipe 11, that is, the longitudinal axis. Accordingly, the distal end P2 of the sensor guide 21 is also located forward of the fixing point F.

Further, the distal end P2 of the sensor guide 21 is positioned rearward of the GPF 12. As such, the shortest distance from the distal end P2 of the sensor guide 21 to the GPF 12 is shorter than the shortest distance from the proximal end P1 of the sensor guide 21 to the GPF 12. The shortest distance from the distal end P2 of the sensor guide 21 to the GPF 12 is less than or equal to 30 cm, specifically, 20 cm. There are no other members on a line segment connecting the distal end P2 of the sensor guide 21 and the GPF 12 by the shortest distance.

Operation of Present Embodiment

First, the positional relationship between the proximal end P1 of the sensor guide 21 and the fixing point F of the lead 25 will be described. It is assumed that the proximal end P1 of the sensor guide 21 is located forward of the fixing point F. In this case, if the proximal end P1 moves rearward, the proximal end P1 gradually approaches the fixing point F.

On the other hand, it is assumed that the proximal end P1 of the sensor guide 21 is located at the same position as the fixing point F or rearward of the fixing point F in the direction along the central axis C, that is, the longitudinal axis. In this case, if the proximal end P1 moves rearward, the proximal end P1 gradually moves away from the fixing point F. Therefore, in the case of the example described above, if the proximal end P1 moves rearward, the distance between the distal end P2 of the sensor guide 21 and the fixing point F may increase depending on the shape of the sensor guide 21.

Figure 4:
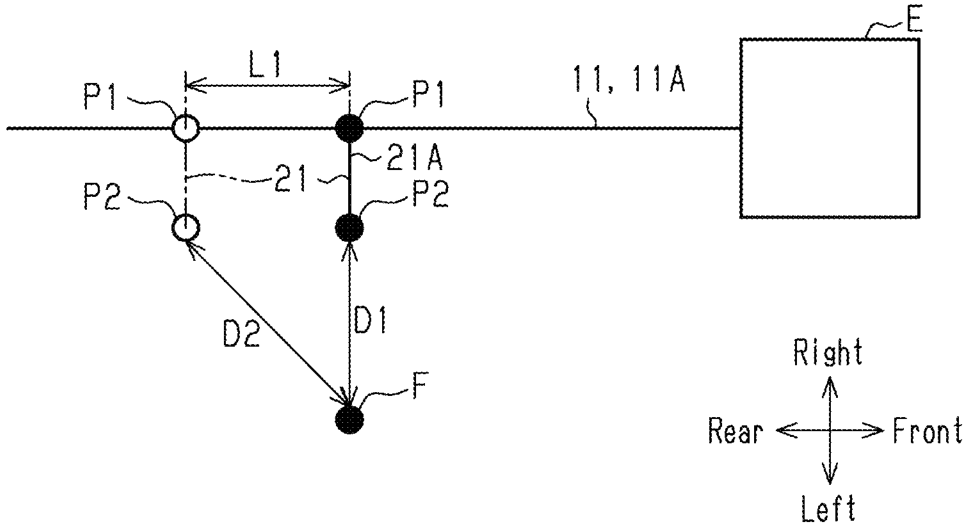
FIG. 4 is a diagram of an exhaust structure of a comparative example, illustrating a positional relationship between a sensor guide and a fixing point when an exhaust pipe is thermally expanded.

Specifically, it is assumed that the sensor guide 21 has only the first portion 21A as shown in FIG. 4. In other words, it is assumed that the distal end P2 of the sensor guide 21 is at the same position as the proximal end P1 in the direction along the longitudinal axis.

It is assumed that the positions of the proximal end P1 and the distal end P2 of the sensor guide 21 when the temperature of the exhaust pipe 11 is relatively low are positions indicated by filled circles in FIG. 4. When the temperature of the exhaust pipe 11 increases, the exhaust pipe 11 is thermally expanded. At this time, since the internal combustion engine E is fixed to the body of the vehicle, the position of the internal combustion engine E with respect to the body does not change. Therefore, the exhaust pipe 11 expands rearward. As a result, the proximal end P1 of the sensor guide 21 is displaced rearward as indicated by a blank circle in FIG. 4. Similarly, the distal end P2 of the sensor guide 21 is displaced rearward. In FIG. 4, a displacement length L1 of the proximal end P1 and the distal end P2 is shown in an exaggerated manner. The displacement length L1 is actually in a range of a few millimeters to a few centimeters.

On the other hand, the mounting member 30 is fixed to the under panel 50, which is part of the body of the vehicle. The position of the fixing point F, which is a contact point between the lead 25 and the mounting member 30, with respect to the body does not substantially change regardless of whether the exhaust pipe 11 has been thermally expanded. Thus, before the exhaust pipe 11 is thermally expanded, the distal end P2 is located on the right side of the fixing point F. Then, after the exhaust pipe 11 is thermally expanded, the distal end P2 moves away obliquely rearward and rightward from the fixing point F. Accordingly, the distance D2 between the distal end P2 and the fixing point F after the exhaust pipe 11 is thermally expanded is larger than the distance D1 between the distal end P2 and the fixing point F before the exhaust pipe 11 is thermally expanded.

Figure 5:
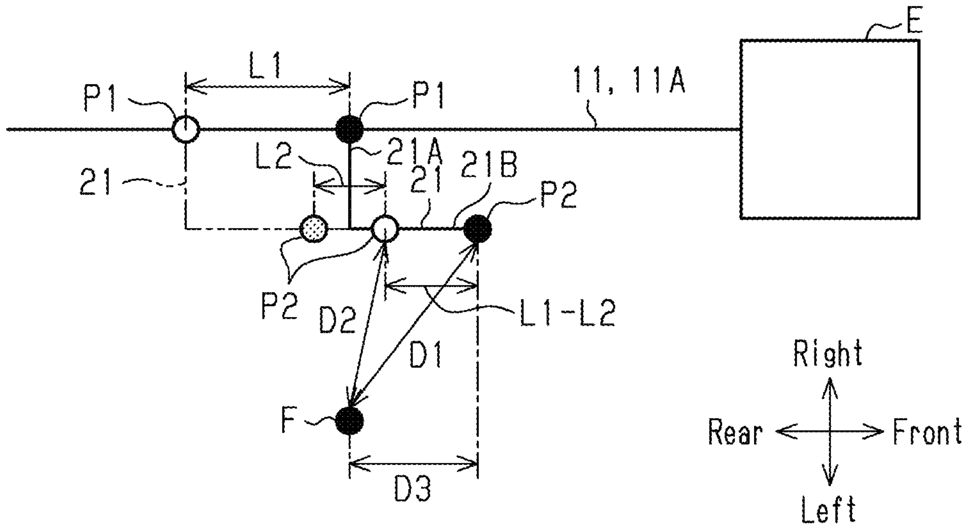
FIG. 5 is a diagram of the exhaust structure of the embodiment, illustrating a positional relationship between a sensor guide and a fixing point when an exhaust pipe is thermally expanded.

Next, a case of the present embodiment, which is illustrated in FIG. 5, will be described.

It is assumed that the positions of the proximal end P1 and the distal end P2 of the sensor guide 21 when the temperature of the exhaust pipe 11 is relatively low are positions indicated by filled circles in FIG. 5. When the temperature of the exhaust pipe 11 increases, the exhaust pipe 11 is expanded rearward. As a result, the proximal end P1 of the sensor guide 21 is displaced rearward as indicated by a blank circle in FIG. 5. The displacement length at this time is referred to as a displacement length L1.

If the sensor guide 21 is not thermally expanded, the position of the distal end P2 of the sensor guide 21 is a position shifted rearward by the displacement length L1 from the position of the distal end P2 prior to the thermal expansion, as indicated by a stippled circle in FIG. 5. However, the second portion 21B of the sensor guide 21 is also thermally expanded. The second portion 21B is thermally expanded from the left end of the first portion 21A toward the distal end P2, that is, forward. Therefore, as illustrated by a blank circle in FIG. 5, the distal end P2 after the thermal expansion is displaced forward with respect to the position of the distal end P2 (indicated by the stippled circle) on the assumption that the sensor guide 21 is not thermally expanded. This displacement length is referred to as a displacement length L2. These factors show that the rearward displacement length of the distal end P2 of the sensor guide 21 is L1−L2 before and after thermal expansion, which is smaller than the displacement length L1 of the proximal end P1.

In the present embodiment, in a state in which the exhaust pipe 11 is not thermally expanded, the distal end P2 of the sensor guide 21 is located forward of the fixing point F. Thus, before the exhaust pipe 11 is thermally expanded, the distal end P2 is located obliquely forward and rightward of the fixing point F. Then, as the exhaust pipe 11 is thermally expanded, the distal end P2 approaches a position on the right side of the fixing point F. When the distal end P2 is positioned on the right side of the fixing point F, the distance between the fixing point F and the distal end P2 is shortest. It is now assumed that the rearward displacement length (L1−L2) of the distal end P2 is less than or equal to a distance D3 between the fixing point F and the distal end P2 along the central axis C before the thermal expansion. Under this condition, the distance D2 between the distal end P2 and the fixing point F after the exhaust pipe 11 is thermally expanded is smaller than the distance D1 between the distal end P2 and the fixing point F before the exhaust pipe 11 is thermally expanded.

Advantages of Present Embodiment (1) As described in the section of operation, the rearward displacement length L1 of the proximal end P1 of the sensor guide 21 due to the thermal expansion of the exhaust pipe 11 is partially cancelled out by the forward displacement length L2 of the distal end P2 of the sensor guide 21. This limits a change in the positional relationship between the distal end P2 of the sensor guide 21 and the fixing point F in the direction along the central axis C of the exhaust pipe 11 due to thermal expansion. Accordingly, an excessive tensile force is prevented from acting on the lead 25 due to a change in the positional relationship between the distal end P2 of the sensor guide 21 and the fixing point F.

(2) As described in the section of operation, it is assumed that the rearward displacement length (L1−L2) of the distal end P2 is less than or equal to the distance D3 between the fixing point F and the distal end P2 along the central axis C before the thermal expansion. Under this condition, as the exhaust pipe 11 and the sensor guide 21 are thermally expanded, the distance D2 between the distal end P2 of the sensor guide 21 and the fixing point F decreases. Therefore, if the rearward displacement length of the distal end P2 meets the above-described condition, a strong tensile force does not act on the lead 25 in accordance with thermal expansions of the exhaust pipe 11 and the sensor guide 21. On the contrary, the tensile force of the leads 25 is reduced.

(3) Heat of the exhaust pipe 11 is transmitted to the sensor guide 21 from the proximal end P1. Therefore, the proximal end side P1 of the sensor guide 21 is easily heated by the heat of the exhaust pipe 11, and the distal end side P2 of the sensor guide 21 is not easily heated by the heat of the exhaust pipe 11. On the other hand, the distal end P2 of the sensor guide 21 is located rearward of the GPF 12 in the above-described embodiment. A large amount of heat from the GPF 12 thus acts on the distal end P2 of the sensor guide 21. Therefore, even if heat from the exhaust pipe 11 is not easily transmitted to the distal end P2, the distal end P2 and the vicinity thereof are warmed by the heat from the GPF 12. As a result, the above-described displacement length L2 is increased.

(4) The shortest distance between the GPF 12 and the distal end P2 of the sensor guide 21 is less than or equal to 30 cm. In other words, the distal end P2 of the sensor guide 21 is located in the vicinity of the GPF 12 such that the distal end P2 is thermally expanded by the heat of the GPF 12. Further, no other members are interposed between the GPF 12 and the distal end P2. The heat from the GPF 12 thus efficiently acts on the distal end P2 of the sensor guide 21. Therefore, thermal expansion is likely to occur in the vicinity of the distal end P2 of the sensor guide 21.

(5) The second portion 21B of the sensor guide 21 is positioned to descend toward the distal end P2. With this configuration, even if water enters the sensor guide 21 from the distal end P2 of the sensor guide 21, the water is drained to the outside of the sensor guide 21 under its own weight.

<Modifications>

The above-described embodiment may be modified as follows. The above-described embodiment and the following modifications can be combined as long as the combined modifications remain technically consistent with each other.

The exhaust structure 10 of the above-described embodiment may include members other than the GPF 12 and the exhaust gas temperature sensors 13. For example, the GPF 12 may be omitted from the exhaust structure 10. Also, the exhaust structure 10 may include a catalyst device that purifies exhaust gas instead of or in addition to the GPF 12. When a catalyst device is provided instead of the GPF 12, the positional relationship between the catalyst device and the sensor guide 21 may be set in the same manner as the positional relationship between the GPF 12 and the sensor guide 21 in the above-described embodiment.

Further, the exhaust structure 10 may include an air-fuel ratio sensor. When a sensor other than the exhaust gas temperature sensor 13 is provided, the configuration of the above-described embodiment may be employed for a sensor guide of that other sensor in addition to or instead of the sensor guide 21 of the exhaust gas temperature sensor 13.

The central axis C of the exhaust pipe 11 does not necessarily need to extend along the longitudinal axis of the vehicle. In other words, the central axis C of the exhaust pipe 11 may be tilted with respect to the longitudinal axis of the vehicle. In this case, the first direction does not agree with the front of the vehicle, and the second direction does not agree with the rear of the vehicle.

The exhaust pipe 11 and the GPF 12 may be mounted at any positions in the vehicle. That is, the exhaust pipe 11 and the GPF 12 does not necessarily need to be located in the center tunnel 50B of the under panel 50.

The exhaust gas temperature sensor 13 may be attached to the exhaust pipe 11 in any manner. That is, the present disclosure is not limited to the configuration in which the exhaust gas temperature sensor 13 is fixed to the attachment portion 11B of the exhaust pipe 11.

The lead 25 is not limited to one wire. That is, multiple wires may be present as the lead 25. In this case, the multiple wires of the lead 25 are passed through the sensor guide 21.

The connector 26 may be omitted. Any structure may be employed if the lead 25 can be electrically connected to an electronic control unit or the like.

The structure of the mounting member 30 is not limited. The mounting member 30 may have any structure as long as it can fix the lead 25 to the body of the vehicle. Further, the mounting member 30 may be omitted and the lead 25 may be directly fixed to the body of the vehicle by an adhesive or the like. In this case, the section of the lead 25 that is in contact with the adhesive is the fixing point F.

The object to which the lead 25 is fixed is not limited to the under panel 50. The object to which the lead 25 is fixed may be a panel other than the under panel 50, or may be a frame of the vehicle. That is, the body of the vehicle includes a frame that is the framework of the vehicle and a panel that is the outer shell of the vehicle.

The fixing point F may be located forward of the proximal end P1 of the sensor guide 21. In this case as well, the positional relationship between the distal end P2 of the sensor guide 21 and the fixing point F changes when the proximal end P1 is displaced rearward due to thermal expansion of the exhaust pipe 11.

The shape of the sensor guide 21 may be changed. As long as the distal end P2 is located on the front side of the proximal end P1 of the sensor guide 21, the shape of the sensor guide 21 can be changed in consideration of the direction in which the lead 25 is drawn out. For example, the sensor guide 21 may be bent multiple times in the middle or may be curved in an arcuate shape.

The distal end P2 of the sensor guide 21 may be located leftward or forward of the GPF 12. Also, the shortest distance between the distal end P2 of the sensor guide 21 and the GPF 12 may be larger than 30 cm. Further, another member may be interposed between the distal end P2 and the GPF 12 of the sensor guide 21. Even in this case, if the mounting state of the sensor guide 21 receives heat from the GPF 12, the vicinity of the distal end P2 of the sensor guide 21 is thermally expanded. Further, since heat is transferred from the proximal end side P1 to the distal end side P2 of the sensor guide 21, the vicinity of the distal end side P2 of the sensor guide 21 is also thermally expanded.

The distal end P2 of the sensor guide 21 may be located rearward of the fixing point F. This configuration prevents the distal end P2 from moving rearward due to thermal expansion of the exhaust pipe 11 by the amount corresponding to the forward displacement length L2 of the distal end P2 of the sensor guide 21.

The first portion 21A of the sensor guide 21 may be positioned to descend toward the left end. In other words, the entire sensor guide 21 may be positioned on the lower side toward the distal end P2. Alternatively, the entire sensor guide 21 may extend along the horizontal plane. Further, part or the entirety of the sensor guide 21 may be positioned to ascend toward the distal end P2.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An exhaust structure for an internal combustion engine, comprising:

an exhaust pipe fixed to the internal combustion engine;

a tubular sensor guide including a proximal end fixed to the exhaust pipe;

a sensor fixed to the exhaust pipe; and a lead extending from the sensor through an inside of the sensor guide to an outside of the sensor guide, the lead being fixed to a body of a vehicle at the outside of the sensor guide, wherein a direction along a central axis of the exhaust pipe and toward an upstream side of exhaust gas is defined as a first direction, and a distal end of the sensor guide is located in the first direction as viewed from the proximal end, a section of the lead that is fixed to the body is a fixing point and the distal end is located in the first direction as viewed from the fixing point, and the fixing point is located at the same position as the proximal end of the sensor guide in the direction along a central axis of the exhaust pipe.

2. The exhaust structure for the internal combustion engine according to claim 1, comprising, in the exhaust pipe, a GPF that traps particulate matter in exhaust gas or a catalyst device that purifies the exhaust gas wherein the distal end is located in a second direction, which is opposite to the first direction, with respect to the GPF or the catalyst device.

3. The exhaust structure for the internal combustion engine according to claim 2, wherein a shortest distance between the GPF and the distal end is less than or equal to 30 cm, and no other member is interposed between the GPF and the distal end.

4. The exhaust structure for the internal combustion engine according to claim 2, wherein a shortest distance from the distal end of the sensor guide to the GPF is shorter than a shortest distance from the proximal end of the sensor guide to the GPF.

5. The exhaust structure for the internal combustion engine according to claim 4, wherein the sensor guide including:

a first portion including the proximal end; and a second portion including a distal end on an opposite side to the proximal end, wherein the second portion is longer than the first portion.

6. The exhaust structure for the internal combustion engine according to claim 1, wherein, in a state in which the exhaust structure is mounted on the vehicle, a portion of the sensor guide that includes the distal end or the entire sensor guide is positioned to descend toward the distal end.

7. The exhaust structure for the internal combustion engine according to claim 1, further comprising a mounting member configured to fix the lead to the body of the vehicle, the mounting member including:

a bracket configured to be fixed to the body of the vehicle body, and a wire configured to be fixed to the bracket and hold and support the lead.

8. The exhaust structure for the internal combustion engine according to claim 7, the lead including:

a first end connected to the sensor; and a second that is located outside the sensor guide, wherein the fixing point is a point at which the lead first comes into contact with the wire when the lead is traced from the first end toward the second end of the lead.

9. The exhaust structure for the internal combustion engine according to claim 8, wherein the sensor guide including:

a first portion including the proximal end; and a second portion including a distal end on an opposite side to the proximal end, wherein the second portion is longer than the first portion.

10. The exhaust structure for the internal combustion engine according to claim 1, wherein the sensor guide including:

a first portion including the proximal end; and a second portion including a distal end on an opposite side to the proximal end, wherein the second portion is longer than the first portion.

* * * * *